(12) United States Patent
Ootani et al.

(10) Patent No.: US 6,959,365 B2
(45) Date of Patent: Oct. 25, 2005

(54) MICROCOMPUTER INCLUDING A FLASH MEMORY AND A FLASH MEMORY REWRITE PROGRAM STORED THEREIN

(75) Inventors: Naoki Ootani, Tokyo (JP); Yoshio Kasai, Tokyo (JP); Toshihiro Abe, Tokyo (JP); Mitsuru Sugita, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 234 days.

(21) Appl. No.: 10/138,567

(22) Filed: May 6, 2002

(65) Prior Publication Data

US 2003/0093612 A1 May 15, 2003

(30) Foreign Application Priority Data

Nov. 15, 2001 (JP) .................................... P2001-350151

(51) Int. Cl.⁷ .............................................. G06F 12/00
(52) U.S. Cl. ........................ 711/152; 711/103; 712/32; 712/37
(58) Field of Search ................................ 711/103, 152; 712/32, 37

(56) References Cited

U.S. PATENT DOCUMENTS

| | | | | |
|---|---|---|---|---|
| 4,093,823 A | * | 6/1978 | Chu .......................... 370/535 |
| 5,337,281 A | * | 8/1994 | Kobayashi et al. ..... 365/185.13 |
| 5,444,664 A | * | 8/1995 | Kuroda et al. .............. 365/226 |
| 5,678,082 A | * | 10/1997 | Miyazawa et al. .......... 396/300 |
| 5,923,838 A | * | 7/1999 | Hongo ........................ 714/42 |
| 5,974,528 A | * | 10/1999 | Tsai et al. ...................... 712/37 |
| 5,991,849 A | * | 11/1999 | Yamada et al. ............. 711/103 |
| 6,128,675 A | * | 10/2000 | Ko .............................. 710/23 |
| 6,324,096 B1 | * | 11/2001 | Tomita .................. 365/185.05 |
| 6,601,131 B2 | * | 7/2003 | Sezaki et al. ................ 711/103 |
| 2003/0058733 A1 | * | 3/2003 | Mori ........................ 365/238.5 |

FOREIGN PATENT DOCUMENTS

| | | |
|---|---|---|
| JP | 64-26264 | 1/1989 |
| JP | 10-177563 | 6/1998 |

OTHER PUBLICATIONS

"RTL Design with VHDL"□□The University of British Columbia□□ELEC 379: Design of Digital and Microcomputer systems□□1999/2000 Winter Session, Term 2□□.*

* cited by examiner

*Primary Examiner*—Tuan V. Thai
*Assistant Examiner*—Hetul Patel
(74) *Attorney, Agent, or Firm*—Oblon, Spivak, McClelland, Maier & Neustadt, P.C.

(57) ABSTRACT

A microcomputer with a built-in flash memory is obtained in which the flash memory can be properly rewritten with a rewrite program kept placed on the flash memory and without requiring additional complicated control circuitry. On accepting an erase/write command which constitutes a rewrite command, a flash memory module (2) outputs to a flash memory control circuit (3) a ready status signal RYIBY indicative of a busy state during execution of the series of processing. When the ready status signal RYIBY indicates the busy state, the flash memory control circuit (3) outputs a hold signal HOLD at active "H," in order to inhibit a CPU (1) from accessing the flash memory module (2). When the ready status signal RYIBY has recovered the ready state, the flash memory control circuit (3) outputs the hold signal HOLD at "L" to allow the CPU (1) to access the flash memory module (2).

13 Claims, 17 Drawing Sheets

F I G. 3

| | | |
|---|---|---|
| 1 8000H | MEMORY BLOCK 0 | 64KB |
| 1 9FFFH | | |
| 1 A000H | MEMORY BLOCK 1 | 64KB |
| 1 BFFFH | | |
| 1 C000H | MEMORY BLOCK 2 | 64KB |
| 1 DFFFH | | |
| 1 E000H | MEMORY BLOCK 3 | 32KB |
| 1 EFFFH | | |
| 1 F000H | MEMORY BLOCK 4 | 8KB |
| 1 F3FFH | | |
| 1 F400H | MEMORY BLOCK 5 | 8KB |
| 1 F7FFH | | |
| 1 F800H | MEMORY BLOCK 6 | 8KB |
| 1 FBFFH | | |
| 1 FC00H | MEMORY BLOCK 7 | 4KB |
| 1 FDFFH | | |
| 1 FE00H | MEMORY BLOCK 8 | 4KB |
| 1 FFFFH | | |

14

| | | |
|---|---|---|
| 0 0000H | MEMORY BLOCK 9 | 8KB |
| 0 03FFH | | |

| | | |
|---|---|---|
| 1 0000H | MEMORY BLOCK 10 | 4KB |
| 1 01FFH | | |

FIG. 4

| COMMANDS | NUMBER OF CYCLE(S) | FIRST BUS CYCLE | | | SECOND BUS CYCLE | | | OTHERS | |
|---|---|---|---|---|---|---|---|---|---|
| | | MODE | ADDRESS | DATA (D7-D0) | MODE | ADDRESS | DATA (D15-D0) | RY/BY | /PREBUSY |
| AUTOMATIC CHIP ERASE | 2 | WRITE | ARBITRARY | 20H | WRITE | ARBITRARY | 20H | L | L |
| AUTOMATIC BLOCK ERASE | 2 | WRITE | ARBITRARY | 20H | WRITE | BA | D0H | L | L |
| AUTOMATIC WRITE | 2 | WRITE | ARBITRARY | 40H | WRITE | WA | WD | L | L |
| LOCK BIT PROGRAM | 2 | WRITE | ARBITRARY | 77H | WRITE | BA | D0H | L | L |
| LOCK BIT READ | 2 | WRITE | ARBITRARY | 71H | READ | BA | (D6) | H | H |
| MEMORY READ TRANSITION | 1 | WRITE | ARBITRARY | FFH | — | — | — | H | H |
| STATUS REGISTER READ MODE TRANSITION | 2 | WRITE | ARBITRARY | 70H | READ | ARBITRARY | SRD | H | H |
| STATUS REGISTER CLEAR | 1 | WRITE | ARBITRARY | 50H | — | — | — | H | H |

SRD=STATUS REGISTER DATA
WA=WRITE ADDRESS, WD=WRITE DATA
BA=BLOCK ADDRESS···ARBITRARY ADDRESS IN BLOCK
(D6)=LOCK BIT STATUS IS OUTPUTTED FROM D6: NON-BLOCK = "H," BLOCK LOCK = "L"

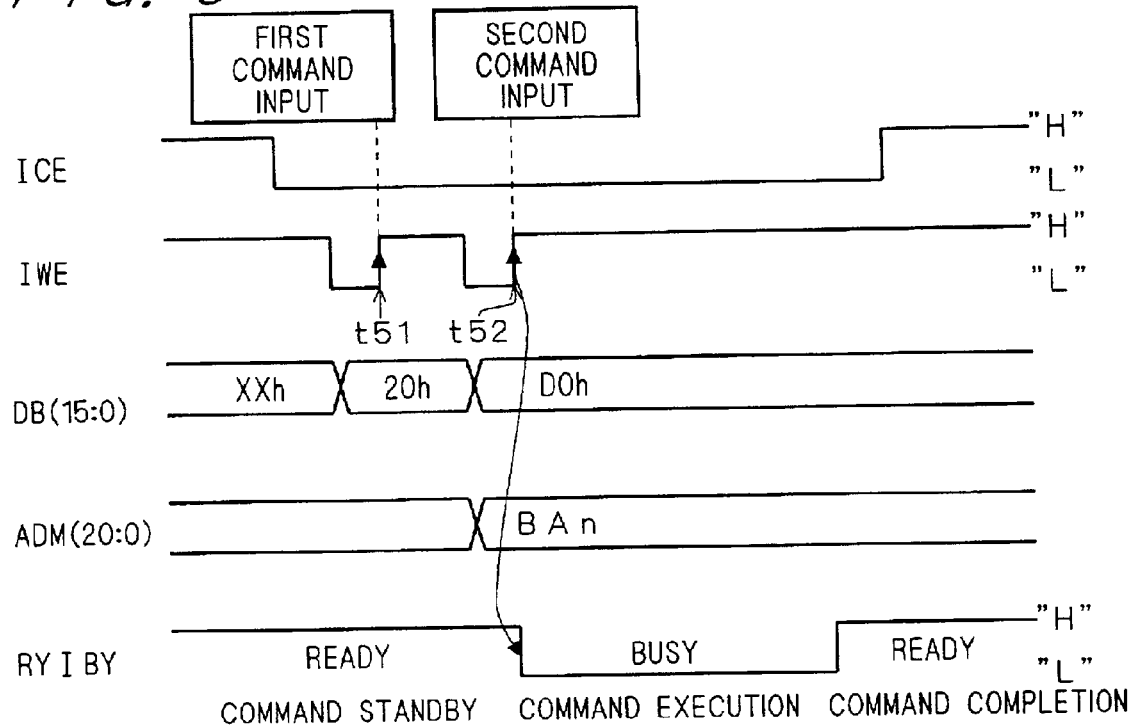

F I G. 1 1
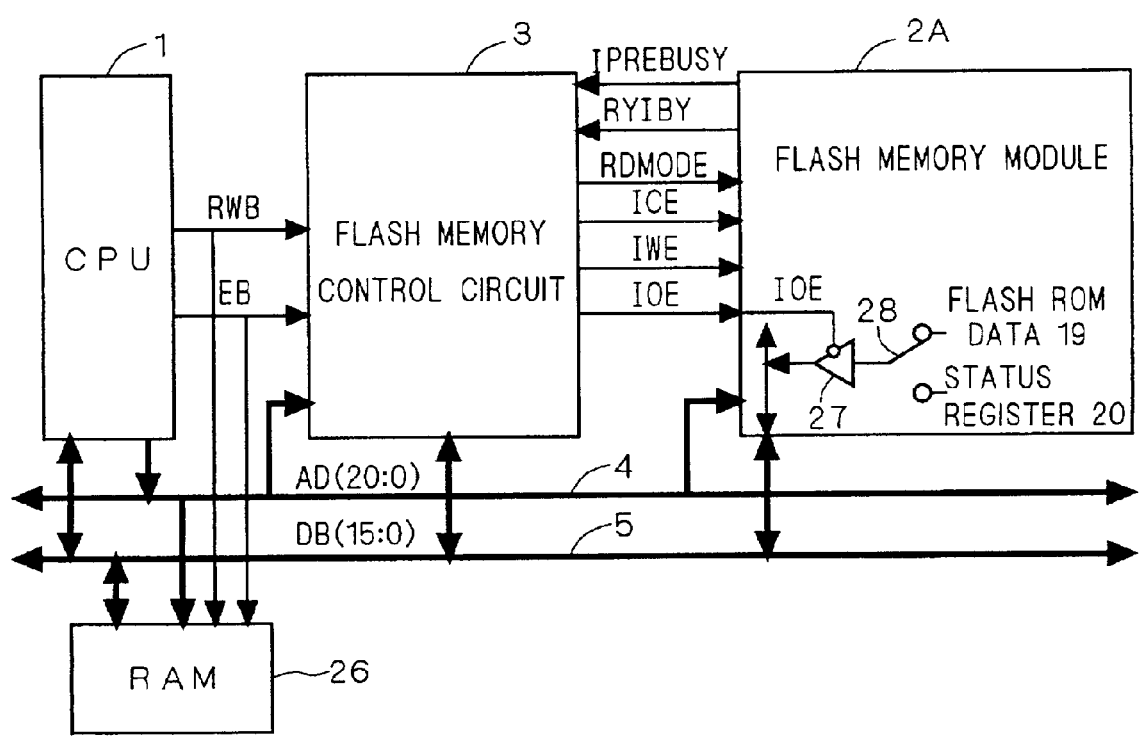

MICROCOMPUTER INCLUDING A FLASH MEMORY AND A FLASH MEMORY REWRITE PROGRAM STORED THEREIN

BACKGROUND OF THE INVENTION

1. Field of the Invention

The present invention relates to a microcomputer, such as a microcontroller, which contains a flash memory.

2. Description of the Background Art

Conventionally, in a microcontroller (microcomputer) with a built-in flash memory, the contents stored in the flash memory are generally erased and written by a CPU in the two situations shown below.

In a first situation, the rewriting is achieved while no user program is running in the microcontroller. The microcontroller itself is placed in the stopped state and the contents stored in the flash memory are rewritten by external rewriting equipment, such as a flash writer, through an interface for flash rewrite control. Alternatively, a specialized program for rewriting the flash memory is run and the contents stored in the flash memory are rewritten by utilizing an interface of a serial communication function.

In a second situation, the rewriting is accomplished by using a function as the microcontroller. While the microcontroller is operating, the contents stored in the flash memory are rewritten in the background with a rewrite program stored in the flash memory in the microcontroller.

Rewriting in the second situation includes a first method in which the flash rewrite program stored in the flash memory is transferred to an additional RAM provided in the microcontroller and then run on the RAM.

Rewriting in the second situation also includes a second method, where a control circuit capable of background processing is provided in hardware.

The second method is now described with an example. The second method requires circuitry for controlling the flash memory. That is, while a certain block in a flash memory, which is divided into blocks, is undergoing erase/write processing, the flash memory control circuitry allows the CPU, in parallel, to read and execute a program stored on the flash memory in a block or blocks other than the block being rewritten.

Specifically, rewriting (writing/erasing) and reading in parallel requires that the potential generating circuitry in the flash memory circuit block include two systems for writing/erasing and normal reading. This necessitates an increased area and causes the control circuitry, such as a microsequencer, to be configured complicatedly.

In the first situation, there is a problem that the flash memory cannot be rewritten while the microcontroller is actually being used after mounted by soldering etc. in the user system. Applications in some fields of the microcontroller with built-in flash memory may expect data to be rewritten while the microcontroller is being used. This method, which cannot be used under such conditions, is therefore disadvantageous.

The first and second methods capable of rewriting in the second situation are intended to solve this problem.

The first method, however, requires previously transferring the program from the flash memory to the RAM, which is disadvantageous because it imposes a transfer workload on the CPU and requires RAM capacity for the CPU rewrite program.

Also, in the second method which uses control circuitry capable of background processing, rewriting the memory in the background without interrupting operation of the microcontroller requires complicated control circuitry as stated above.

This requires larger control circuitry per same memory capacity as compared with a chip having no background rewriting function. Complicated control circuitry in a semiconductor integrated circuit necessitates an increased area, leading to an increased cost.

SUMMARY OF THE INVENTION

It is an object of the present invention to obtain a microcomputer with a built-in flash memory which can properly rewrite the flash memory with a rewrite program kept placed on the flash memory, and without requiring additional complicated control circuitry.

According to the present invention, a microcomputer includes a CPU, a flash memory portion and a flash memory circuit.

The CPU executes a certain instruction. The flash memory portion is divided into a plurality of blocks. The flash memory control circuit controls rewrite operation to said flash memory portion. The CPU is capable of executing a predetermined program being written in at least one of the plurality of blocks. The predetermined program is a program for rewriting a block other than the at least one of the plurality of blocks in the flash memory portion. The flash memory portion executes rewrite operation in the block other than the at least one of the plurality of blocks, on the basis of a rewrite command. Further, the flash memory portion outputs a ready status signal indicating whether the rewrite operation is being executed or not. The flash memory control circuit receives the ready status signal, whereby when the ready status signal indicates that the rewrite operation is to be executed, the flash memory control circuit provides the CPU with a hold signal which indicates that a signal required for the CPU to access the flash memory portion should be fixed constant.

In the microcomputer of the invention, when the ready status signal indicates indicates that the rewrite operation is to be executed, the flash memory control circuit provides the CPU with a hold signal which indicates that a signal required for the CPU to access the flash memory portion should be fixed constant.

It is thus possible to execute the rewrite operation to the flash memory portion while the CPU is executing the predetermined program without requiring complicated control circuitry and the like and with the predetermined program kept placed on the flash memory portion, without requiring transferring the predetermined program written in the flash memory portion to a memory other than the flash memory portion.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an explanation diagram showing an example of a memory address map of the flash memory module;

FIG. 4 is an explanation diagram showing in a table form a list of user commands in the flash memory module;

FIG. 5 is a timing chart showing the basic timing of issue of a command;

FIG. 11 is a block diagram showing the basic structure of a microcontroller with a built-in flash memory according to a third preferred embodiment of the invention;

DESCRIPTION OF THE PREFERRED EMBODIMENTS

<First Preferred Embodiment>

Figure 1:
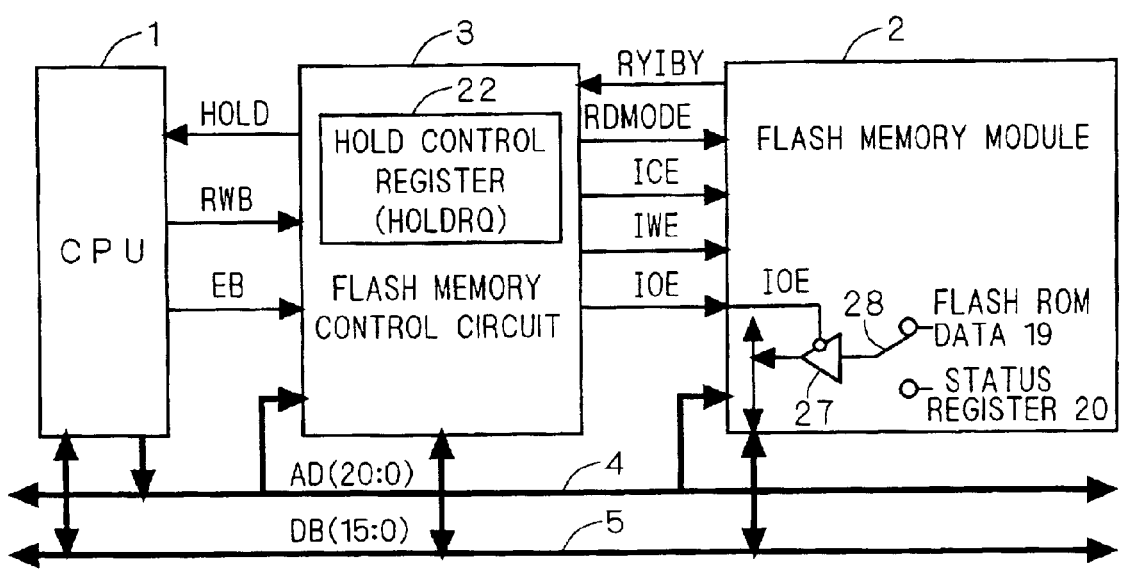
FIG. 1 is a block diagram showing the basic structure of a microcontroller with a built-in flash memory according to a first preferred embodiment of the invention.

FIG. 1 is a block diagram showing the basic structure of a microcontroller with a built-in flash memory according to a first preferred embodiment of the present invention.

As shown in this diagram, a flash memory control circuit 3 is provided between a CPU 1 and a flash memory module 2; the flash memory control circuit 3 controls the interface between the CPU 1 and the flash memory module 2. The CPU 1, the flash memory module 2, and the flash memory control circuit 3 are connected to an address bus 4 and a data bus 5.

The CPU 1 outputs an address signal AD (20:0) to the address bus 4 and receives/sends a data signal DB (15:0) through the data bus 5. The CPU 1 also outputs a read/write control signal RWB and an instruction execution signal EB to control the flash memory control circuit 3. The CPU 1 receives a hold signal HOLD from the flash memory control circuit 3.

The flash memory control circuit 3 receives the address signal AD (20:0) through the address bus 4 and receives/sends the data signal DB (15:0) through the data bus 5. The flash memory control circuit 3 also outputs a read mode signal RDMODE and control signals (ICE, IWE, IOE) to control the rewriting, e.g. erasing/writing, and the reading of the flash memory module 2. The flash memory control circuit 3 receives a ready status signal RYIBY from the flash memory module 2.

The flash memory module 2 receives the address signal AD (20:0) through the address bus 4 and receives/sends the data signal DB (15:0) through the data bus 5.

The ready status signal RYIBY is a signal that allows externally detecting a busy state when an erase/write command, or a rewrite command, has been accepted in the flash memory module 2 and a series of processing is being executed. The flash memory control circuit 3 can thus detect through the ready status signal RYIBY whether a rewrite command is being automatically executed in the flash memory module 2.

The hold signal HOLD is a bus value fixing signal for requesting the CPU 1 to fix the bus values constant; the hold signal HOLD is generated in the flash memory control circuit 3. When the hold signal HOLD is active "H" indicating that the bus values should be fixed, the CPU 1 fixes constant the values of signals necessary for access to the flash memory module 2, including the read/write control signal RWB, the instruction execution signal EB, the address signal AD (20:0), and the data signal DB (15:0). That is to say, access from the CPU 1 to the flash memory module 2 is inhibited.

[Flash Memory Module]

Figure 2:
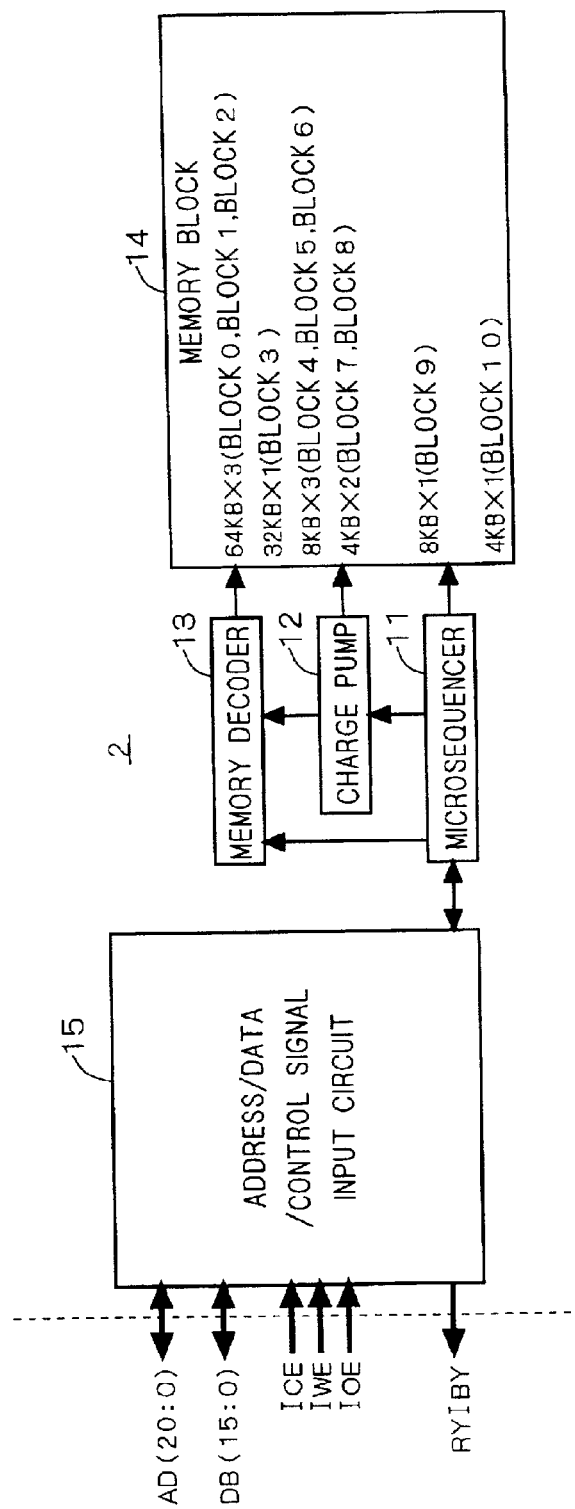
FIG. 2 is a block diagram showing the basic structure of the flash memory module shown in FIG. 1.

FIG. 2 is a block diagram showing the basic structure of the flash memory module. As shown in this diagram, the flash memory module 2 is composed of a microsequencer 11, a charge pump 12, a memory decoder 13, a memory block 14, and an address/data/control signal input circuit 15.

The flash memory module 2 receives the address signal AD (20:0) and the data signal DB (15:0) through the address bus 4 and the data bus 5 and also receives the control signals (ICE, IWE, IOE) from the flash memory control circuit 3. The flash memory module 2 outputs the ready status signal RYIBY.

As shown in FIG. 2, the control signals (ICE, IWE, IOE) include a chip enable signal ICE, a command write signal IWE, and a read signal IOE. The chip enable signal ICE is a select signal which becomes active "L" when the flash module is selected, i.e. when the address hits. When the chip enable signal ICE is "H" (inactive), command writing and reading accesses to the flash memory are all disabled. The command write signal IWE is a signal for writing commands to the microsequencer 11 in the flash memory module 2. When the command write signal IWE is active "L," the address signal AD (20:0) and the data signal DB (15:0) from the address bus 4 and the data bus 5 are inputted and latched in the microsequencer 11 through the address/data/control signal input circuit 15.

The read signal IOE is a signal which, at active "L," causes flash ROM data 19 or status register value 20 to be outputted according to the address signal AD (20:0).

The microsequencer 11 is a control circuit block which, when a command input, e.g. erase/write, to the flash memory module 2 has been accepted, automatically generates signals which are needed for a series of processing to the charge pump 12, memory decoder 13 and the memory block 14, in accordance with the kind of the command.

The charge pump 12 is a group of potential generating circuits which can generate various potential levels required during the processing of various commands.

The memory decoder 13 is a circuit block which controls the selection of required memory cells on the basis of the address signal AD (20:0) and the process of command executions.

The memory block 14 is a block in which a plurality of memory cells are arranged in an array.

FIG. 3 is an explanation diagram showing an example of the memory address map of the flash memory module 2. As shown in this diagram, individual blocks 0 to 10 are independently capable of block erasure (collective erasure by the block). They are capable of being written by the address.

FIG. 4 is an explanation diagram showing in a table form a list of user commands for the flash memory module. As shown in this diagram, the flash memory module 2 is configured to accept the input of commands in accordance with the input values of the externally applied control signals (ICE, IWE, IOE), address signal AD (20:0), and data signal DB (15:0).

The commands are written (the bus cycles in which the mode is write) by making the command write signal IWE "L," and are read (the bus cycles in which the mode is read) by making the read signal IOE "L." The buffer 27 goes into an active state when the read signal IOE is "L," and then the flash ROM data 19 or the status register 20 selected by the selector 28 is externally outputted (to the data bus 5 etc.). When the read signal IOE is "H," the buffer 27 is placed in an inactive, high-impedance state.

FIG. 5 is a timing chart showing the basic timing of an issue of the command. FIG. 5 shows the timing for the automatic block erase command. As shown in this diagram, the commands related to the rewriting, e.g. erasing and writing, of the flash memory are 2-cycle commands.

The microsequencer 11 recognizes "20h" of the data signal DB (15:0) at the "L" to "H" transition of the command write signal IWE at time t51, and also recognizes "D0h" of the data signal DB (15:0) and the block address BAn of the address signal AD (20:0) at the rise of the command write signal IWE at time t52; the microsequencer 11 thus recognizes that the automatic block erase command was issued for the block address BAn in the memory block 14.

That is to say, when the automatic block erase command which involves a busy state is accepted, the microsequencer 11 starts processing and the busy state is maintained until the series of processing has been normally completed, or until an error occurs; during this period the ready status signal RYIBY outputs "L." When the busy state ends, the ready state is entered with RYIBY="H."

When a rewrite command which involves the busy signal, e.g. erase/write, is issued and the busy state takes place, the "status read mode" is entered, where when the flash ROM is read, the contents of the status register 20, including ready/busy status and error status bits, are read.

The microsequencer 11 exercises control on the basis of the control signals (ICE, IWE, IOE) as shown above, in such a way that the "status read mode" continues even after the command sequence has ended and the ready state has been restored.

However, when the memory read transition command (see FIG. 4) is issued in the ready state, the microsequencer 11 provides control to implement the "memory read mode" in which the flash ROM data 19 at the input address (AD (20:0)) can be read.

The read mode signal RDMODE is a pulse input for making a transition from the "status read mode" to the "memory read mode." The flash memory module 2 moves from the "status read mode" into the "memory read mode" with the pulse RDMODE="H."

[CPU]

The CPU 1 is a central processing unit which has functions for outputting the address signal AD (20:0), the data signal DB (15:0), the read/write control output RWB, and the instruction execution signal EB which indicates that the bus cycle is effective. The read/write control output RWB indicates "read" control at "H" and "write" control at "L," and the instruction execution signal EB indicates "invalid" at "H" and "valid" at "L."

The CPU 1 has a program counter inside. While sequentially generating addresses, and fetching instruction data (DB (15:0)) through the data bus 5 from the flash memory module 2, or occasionally from a RAM etc., the CPU 1 issues the read/write control signal RWB and the instruction execution signal EB to perform reading and writing to peripheral functional blocks.

As for access from the CPU 1 to the flash memory module 2, a write access is made with a common transfer instruction to the address in the flash memory module 2, and a read access is made with a common transfer instruction from the address in the flash memory module 2.

In this specification, an access from the CPU 1 to the flash memory module 2 is particularly referred to as a "command." Also, erase, write, or mode transition activities issued to the flash memory module 2 from the CPU 1 are all referred to "rewrite."

The CPU 1 has an instruction queue for a plurality of instructions and is capable of pipeline processing. When a branch instruction (JMP) is executed, the CPU 1 can make invalid the instruction codes fetched in the instruction queue following the JMP instruction, and move to the execution of the instruction at the address to which the jump takes place.

The CPU 1 has a hold function; with the hold signal input, it can fix constant, or place in a high-impedance state, the address signal AD (20:0), the data signal DB (15:0), the read/write control signal RWB, and the instruction execution signal EB.

When the CPU 1 places the control signals in a high-impedance state, it corresponds to the state in which the CPU 1 relinquishes control over the control signals.

[Flash Memory Control Circuit]

The flash memory control circuit 3 is an interface circuit block through which the CPU 1 controls the flash memory module 2; the flash memory control circuit 3 contains a bus hold control register 22.

(Bus Hold Control Register)

The bus hold control register 22 is a register which can be rewritten by a program the CPU 1 runs, by means of the data signal DB (15:0) and the address signal AD (20:0) which are provided from the CPU 1 through the data bus 5 and the address bus 4, and the read/write control signal RWB. The bus hold control register 22 has a bus hold control bit HOLDRQ which constitutes a pre-hold signal for the generation of the bus hold signal.

The bus hold signal HOLD is a signal for fixing the data bus 5 and the address bus 4 constant. The bus hold signal HOLD is generated in such a way that it becomes active "H" when HOLDRQ is "H" (set) and the internally generated command write signal IWE is "L."

[Operations]

Operations of the microcontroller with a built-in flash memory according to the first preferred embodiment of the invention are now described.

The CPU 1 operates according to a user program written in the flash memory module 2. The user program is placed in one block or a plurality of blocks in the memory block 14 (see FIGS. 2 and 3) in the flash memory module 2. The CPU 1 sequentially fetches instructions on the program and executes the instructions through pipeline processing.

The operation performed when the automatic block erase command is issued is now described as an example of operation in which, according to the user program, the CPU 1 issues a rewrite command to the flash memory in a block other than the block(s) where the program is placed.

Figure 6:
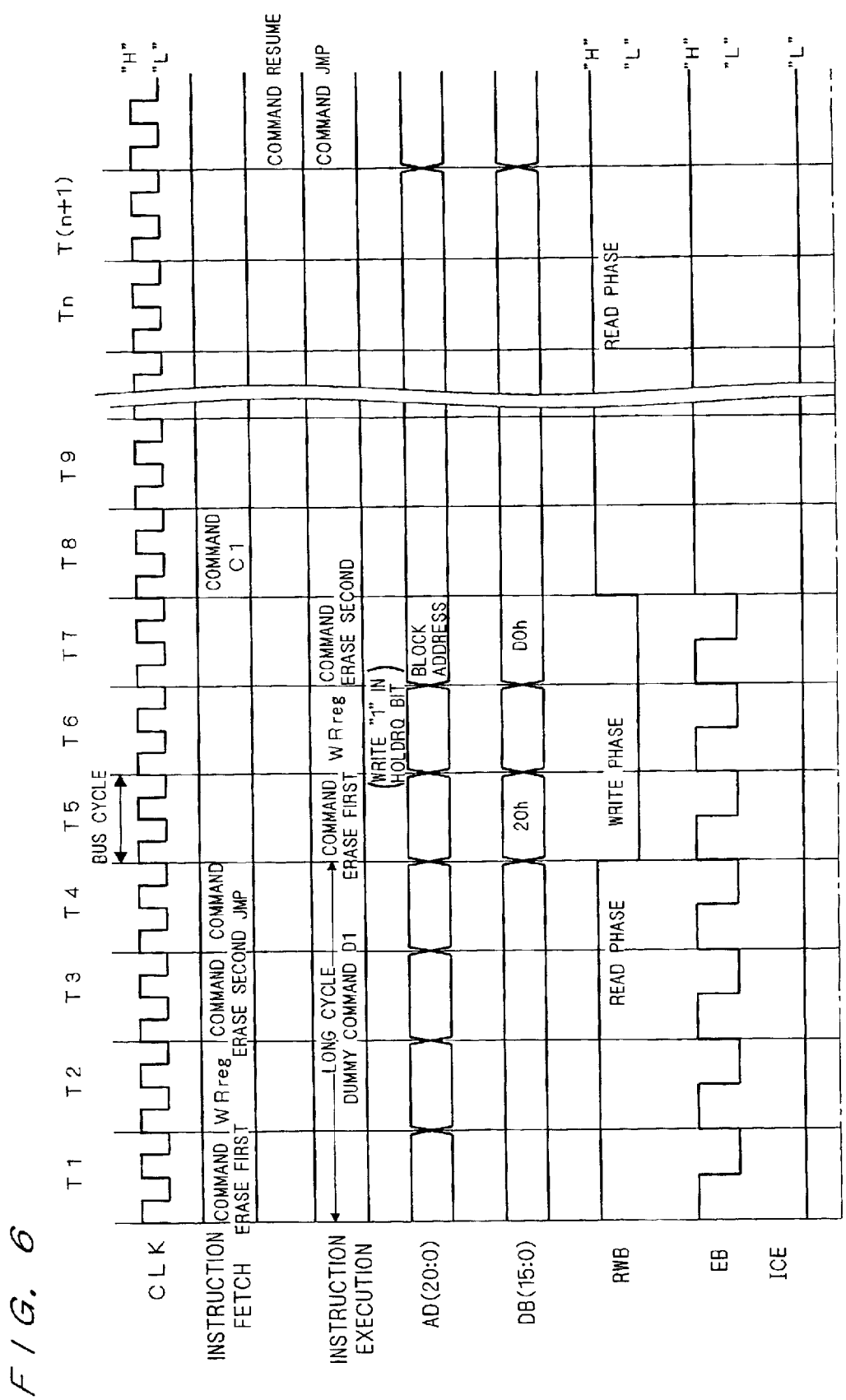
FIGS. 6 and 7 illustrate a timing chart showing the variations of signals during the execution of a block erase command in the microcontroller containing the flash memory of the first preferred embodiment.
Figure 7:
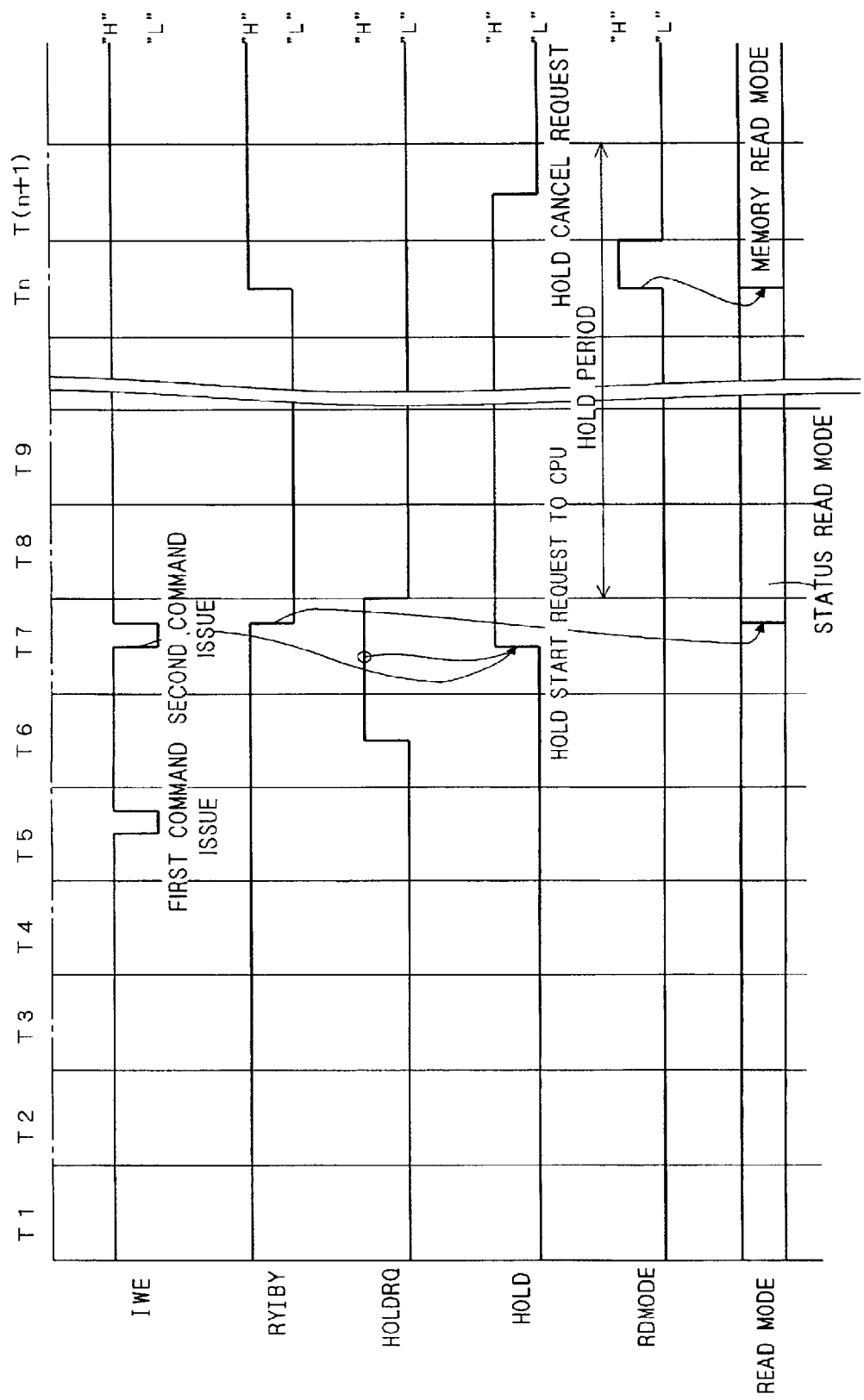

FIGS. 6 and 7 illustrate a timing chart which shows the variations of signals during the execution of the block erase command in the microcontroller with a built-in flash memory of the first preferred embodiment. As shown in this timing chart, each of the bus cycles T1 to T9, Tn and T(n+1) corresponds to two cycles of the operation clock CLK, where instruction fetch and instruction execution are executed in individual bus cycles. FIGS. 6 and 7 show an example in which the instruction fetch is done four bus cycles before the instruction execution.

According to the timing shown in FIGS. 6 and 7, first, a dummy command which does not involve bus access for a long period, for two bus cycles or more, is described in the user program prior to the issue of the first command of the automatic block erase command. The CPU 1 first fetches this instruction, enters it into the instruction queue, and executes it through pipeline processing. When such a dummy command that does not involve bus access for a long period is described in the user program immediately before the flash rewrite command, a vacancy occurs in the instruction queue, which makes it easy to queue the following instructions and hence enables effective use of the instruction queue.

Next, after the CPU 1 has fetched the first command "20h" for block erasure on the data signal DB (15:0) as an instruction (which uses a transfer instruction etc.) for writing to the microsequencer of the flash memory module 2 (this is done in the bus cycle Tl), the CPU 1 outputs RWB="L" and EB="L" in the bus cycle T5 to cause the flash memory control circuit 3 to generate the command write signal IWE which remains at "L" for a given period, and the command write signal IWE is issued to the flash memory module 2. The fall to "L" of the command write signal IWE in the bus cycle T5 corresponds to the receipt of the first command, i.e. the beginning of the receipt of the automatic block erase command. However, note that, as shown in FIG. 5, the contents of the first command are settled at the rise to "H" of the command write signal IWE.

As shown in FIGS. 6 and 7, the command write signal IWE is generated in the flash control circuit 3 in such a way that it becomes effective when operation clock CLK="H" and RWB="L" and EB="L." The flash memory module 2 accepts the first command ("20h") at the rise of the command write signal IWE.

It is described in the user program that a register set instruction WRreg is executed in the next bus cycle T6; the register set instruction WRreg is a relatively easy register setting operation in which the bus hold control bit HOLDRQ in the bus hold control register 22 is set (made "H") prior to the issue of the second command of the block erase command. Thus the bus hold control bit HOLDRQ can be certainly set at "H" prior to the issue of the second command of the block erase command.

The flash memory control circuit 3 contains an internal circuit for generating the hold signal HOLD. The generator circuit generates the hold signal HOLD which becomes active ("H") when HOLDRQ is "H" and the command write signal IWE is "L."The hold signal HOLD is a signal for fixing constant the data bus 5, the address bus 4 and the group of read/write control signals (the read/write control signal RWB and the instruction execution signal EB). When the hold signal HOLD becomes active, the holding starts from the next bus cycle and then the CPU 1 cannot access the flash memory module 2.

In the next bus cycle T7, the second command (D0h) for block erasure is issued according to the user program.

Thus, when the command write signal IWE becomes "L," the generator circuit which operates according to the logic shown above causes the bus hold signal HOLD to become active "H," and the address bus 4 and the data bus 5 are held constant from the next bus cycle T8. The bus hold control bit HOLDRQ is set at "H" prior to the hold signal HOLD, so that the hold signal HOLD can be certainly set at "H" when the receipt of the block erase command is completed.

The address and data bus values held constant may not be the second command of block erasure, since the CPU 1 is performing pipeline processing. The fall to "L" of the command write signal IWE in the bus cycle T7 corresponds to the receipt of the second command, i.e. the end of the receipt of the automatic block erase command. However, note that the contents of the second command are settled at the rise to "H" of the command write signal IWE.

As shown above, the address signal AD (20:0), the data bus DB (15:0), and the group of read/write control signals are fixed constant and bus access from the CPU 1 is interrupted.

At the rising edge of the command write signal IWE, the value of the data signal DB (15:0) is latched in the address/data/control signal input circuit 15 in the flash memory module 2 and the microsequencer 11 performs a command decoding process. At the rising edge of the command write signal IWE at the second command, the microsequencer 11 recognizes the kind of the command, and the flash memory module 2 starts an automatic memory block erasing flow by itself, with the ready status signal RYIBY outputting "L" indicating busy.

Accepting the command and starting the processing, the flash memory module 2 enters the "status read mode" in which the status register value 20 is outputted when read. Accordingly the CPU 1 cannot read the flash ROM data 19 in the flash memory module 2 while the command is being processed and cannot fetch program instructions on the flash memory module 2, either.

While the flash memory module 2 is processing the command with the internal microsequencer 11, RYIBY is "L" indicating the busy state, and when the command processing is ended, the ready signal output RYIBY changes from "L" to "H."

After the ready status signal RYIBY has changed from "L" to "H," the flash control circuit 3 varies the hold signal HOLD from "H" to "L," or makes it ineffective, one bus cycle after.

At this time, the flash memory control circuit 3 makes "H" the read mode set pulse signal RDMODE to the flash memory module 2, so as to cause the flash memory module 2 to leave the "status read mode" and enter the "memory read mode" immediately after the transition from the busy state to the read state, and then the memory contents can be read.

When this read mode signal RDMODE is constantly maintained at "H," it is possible to set the "memory read mode," where the memory contents can be read, always when the flash memory module 2 is in the ready state.

It is also possible to allow the CPU 1 to set the read mode signal RDMODE, with a dedicated register provided in the flash control circuit 3. That is to say, it is possible to set the output of the read mode signal RDMODE effective or ineffective so that the read mode signal RDMODE can be utilized depending on the conditions.

The address bus 4, the data bus 5 and the control signals can thus be released from "fixed," so that the CPU can safely resume its processing including access to the flash memory module 2 without running away.

When a branch instruction (JMP instruction) is placed in the user program immediately after the second command of the flash rewrite command, the commands following the JMP instruction are neglected by the execution of the branch instruction. Then, when the hold is canceled after the rewrite command has been processed and the user program is resumed, the processing can be safely resumed since the JMP instruction is an instruction which was surely fetched and queued in the instruction queue.

Alternatively, when a pipeline clear instruction (PIB instruction) is put in place of the JMP instruction immediately after the flash rewrite second command, a group of instructions queued following the PIB instruction in the instruction queue are cleared. Then, as in the case shown above, the processing can be safely resumed when the hold is canceled after the write command has been processed and the user program is resumed.

As shown above, according to the first preferred embodiment, the address bus 4, the data bus 5 and the control signals are held constant while the flash memory module 2 is processing the rewrite command. Accordingly it is possible to prevent the CPU 1 from running away, which would occur when the CPU 1 cannot read instruction codes on the flash memory module 2 during the command processing.

Further, according to the first preferred embodiment, even with the rewrite program kept placed on the flash memory module 2, the microcontroller can execute flash ROM rewrite instructions to other blocks, while executing the program. Thus it is not necessary to transfer the program from the flush memory to a RAM, as was required in conventional ones, so that the program transfer workload on the CPU can be reduced.

In addition, the microcontroller of the first preferred embodiment is advantageous in that it does not require such complicated control circuitry as is required in the second method, i.e. the background rewriting method, carried out in the second conventional condition.

The first preferred embodiment has described the automatic block erasing operation as an example. However, as shown in FIG. 4, the flash memory module 2 is configured so that the ready status signal RYIBY becomes "L" also during executions of other, plural kinds of rewrite operations, such as the automatic write, lock bit program, etc. Accordingly the effect obtained during the automatic block erasure can be obtained also during other rewrite operations.

<Second Preferred Embodiment>

Figure 8:
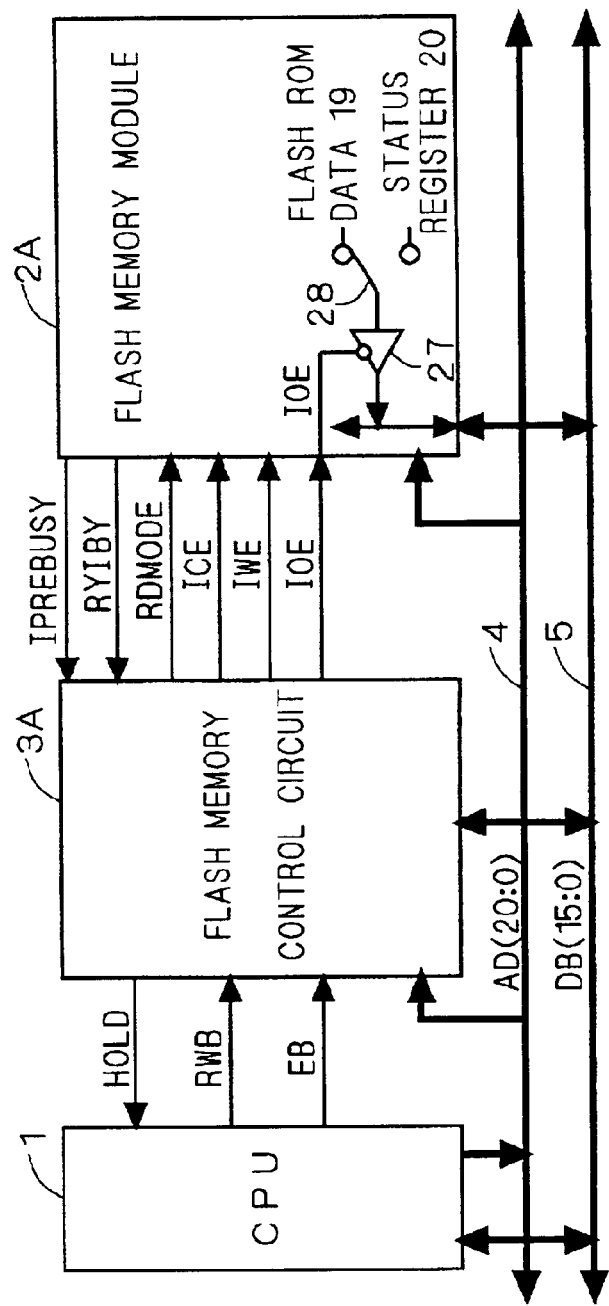
FIG. 8 is a block diagram showing the basic structure of a microcontroller with a built-in flash memory according to a second preferred embodiment of the invention.

FIG. 8 is a block diagram showing the basic structure of a microcontroller with a built-in flash memory according to a second preferred embodiment of the present invention.

The second preferred embodiment differs from the first preferred embodiment in that the flash memory module 2A has a function of generating a command receipt acknowledge signal IPREBUSY, which is a signal for acknowledging the receipt of the rewrite command, prior in time to the detection of busy with the ready status signal RYIBY, so that, when the CPU 1 issues a flash memory rewrite command, the buses can be certainly held constant from the next cycle instruction.

Figure 9:
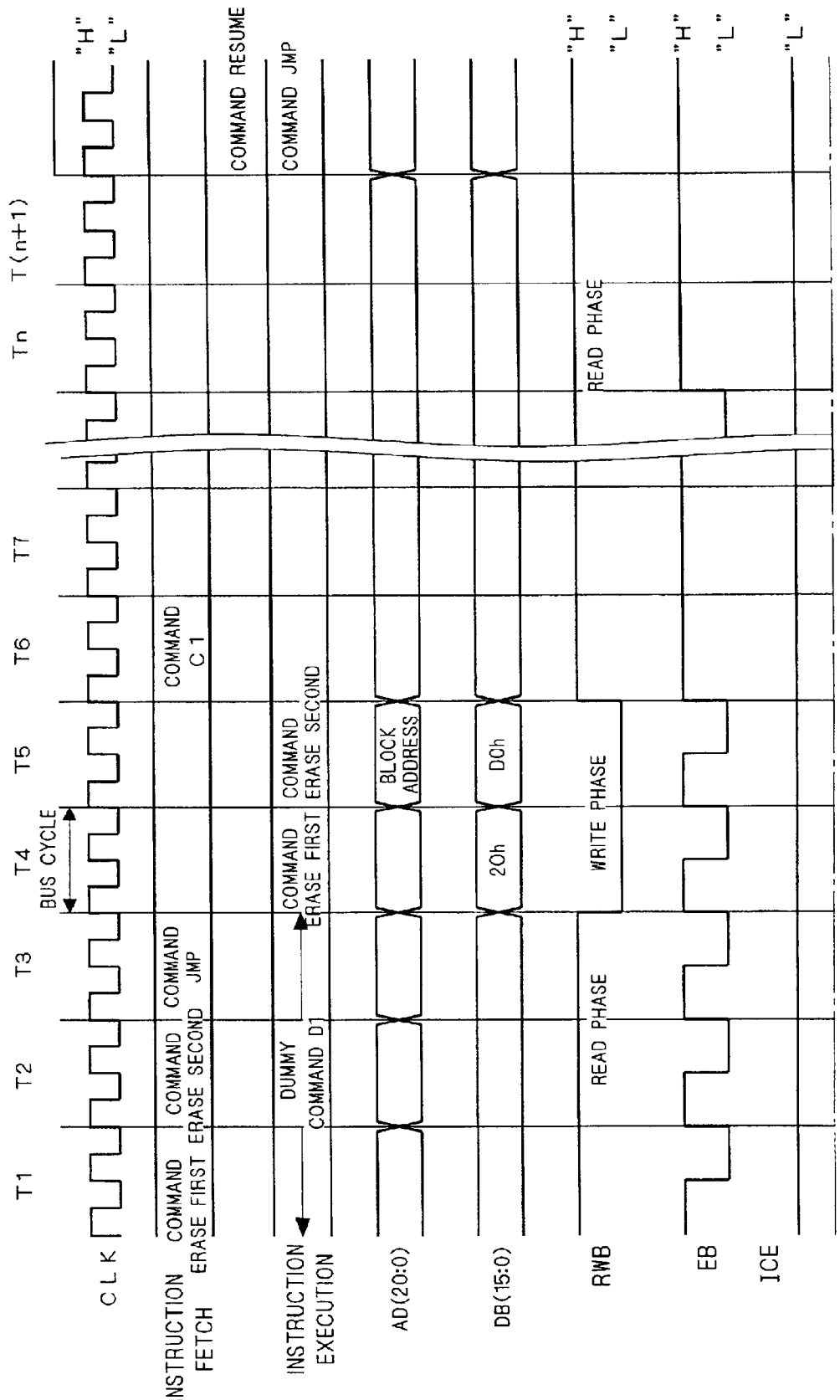
FIGS. 9 and 10 illustrate a timing chart showing the variations of signals during the execution of the block erase command in the microcontroller containing the flash memory of the second preferred embodiment.
Figure 10:
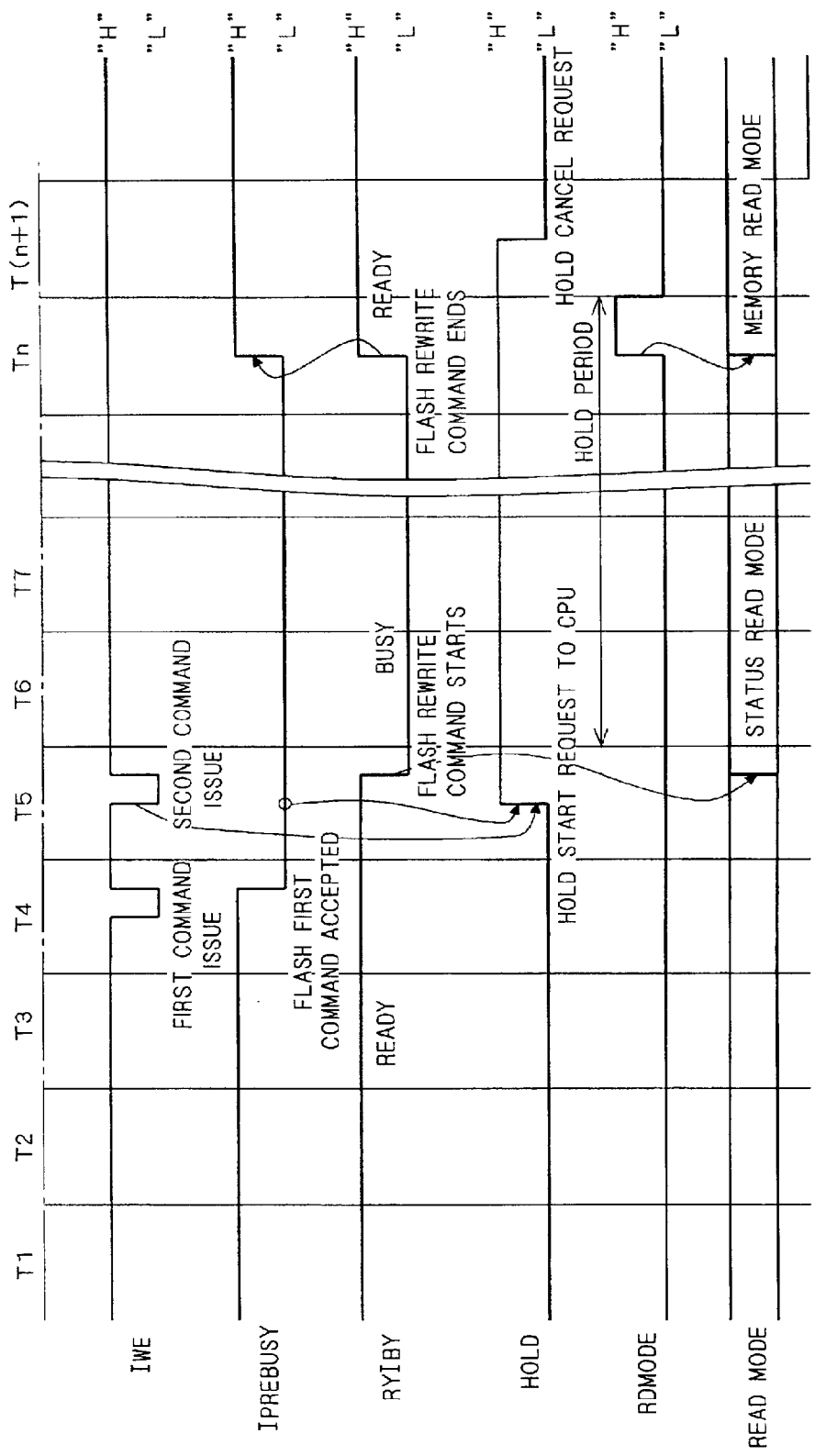

FIGS. 9 and 10 illustrate a timing chart showing the variations of signals during execution of the block erase command in the microcontroller with a built-in flash memory of the second preferred embodiment.

The operation performed when the CPU 1 issues the automatic block erase command is now described as an example in which, according to the user program, the CPU 1 issues a rewrite command to the flash memory in a block other than the block(s) where the program is placed.

According to the timing shown in FIGS. 9 and 10, an instruction which the CPU 1 fetched in a preceding cycle is executed in the bus cycle T4. First, with the first command for block erasure "20h" and RWB="L" and EB="L," signals indicating write to the flash memory module 2A are generated.

As shown in FIGS. 6 and 7, the command write signal IWE is generated in the flash control circuit 3 in such a way that it becomes active "L" with CLK="H" and RWB="L" and EB="L." The flash memory module 2A accepts the first command at the rise of the command write signal IWE.

In the second preferred embodiment, the flash memory module 2A outputs the command receipt acknowledge signal IPREBUSY, which is a rewrite command receipt acknowledge signal for externally acknowledging that the rewrite command has been accepted when the first command was accepted. The command receipt acknowledge signal IPREBUSY becomes active "L" when the first command of any 2-cycle command is accepted. That is to say, the command receipt acknowledge signal IPREBUSY is a negative logic output signal which indicates, at "H," absence of acceptance of the first command, and at "L," acceptance of the first command.

Accordingly, as shown in FIGS. 9 and 10, when the first command for block erasure is accepted, i.e. at the beginning of the receipt of the block erase command, the command receipt acknowledge signal IPREBUSY from the flash memory module 2A varies from "H" to "L."

The command receipt acknowledge signal IPREBUSY is negated (pulled back to "H") when RYIBY="H," i.e. in the ready state.

This command receipt acknowledge signal IPREBUSY is assigned to one bit in the status register 20 or to one bit in a control register (not shown) in the flash memory control circuit 3A, so that the CPU 1 can detect and read the information about the command receipt acknowledge signal IPREBUSY from the flash memory module 2A or from the flash memory control circuit 3A. The information can thus be referred to from the user program and utilized to control the flash memory module 2A.

Alternatively, the flash memory control circuit 3A may issue to the flash memory module 2A plural kinds of rewrite commands which contain different contents corresponding to the different kinds of rewrite commands. Then the flash memory module 2A generates the command receipt acknowledge signal IPREBUSY with the logical OR of a plurality of receipt acknowledge signals corresponding to the plural kinds of rewrite commands.

The circuit for generating the bus hold signal HOLD in the flash memory control circuit 3A is designed so that the bus hold signal HOLD becomes active when the command receipt acknowledge signal IPREBUSY="L" and the command write signal IWE="L."

In the next bus cycle T5, the second command "D0h" of block erasure is issued according to the user program. When the command write signal IWE becomes "L," the generator circuit which operates according to the logic shown above sets the bus hold signal HOLD at active "H" so as to start to hold constant the address bus 4, the data bus 5 and the control signals from the next cycle. In this way, the command receipt acknowledge signal IPREBUSY changes to active "L" before the transition of the hold signal HOLD, so that the hold signal HOLD can certainly be brought to "H" at the end of the receipt of the block erase command.

At this time, the address and data bus values which are held constant may not be the second command of block erasure, since the CPU 1 is performing pipeline processing.

At the rising edge of the command write signal IWE, the data signal DB (15:0) on the data bus 5 is latched in the address/data/control signal input circuit 15 in the flash memory module 2A and the microsequencer 11 performs a command decoding process. The microsequencer 11 then recognizes the kind of the command at the rising edge of the command write signal IWE at the second command and starts a flash memory block erasing flow, and the ready status signal RYIBY outputs "L" indicating busy.

When the flash memory module 2A accepts the command and starts the processing, it enters "the status read mode" where, when read, the status register value 20 is outputted. Accordingly, during the command processing, the CPU 1 cannot read the flash ROM data 19 and cannot fetch program instructions on the flash memory module 2A.

When the flash memory module 2A completes the command processing in the internal microsequencer 11, the ready signal output RYIBY changes from "L" to "H."

After the "L" to "H" transition of the RYIBY signal, the flash control circuit 3A causes the hold signal HOLD to change from "H" to "L" one bus cycle after, thus making it ineffective. When the buses are released from the hold, the program execution processing being interrupted is resumed.

At this time, the flash memory control circuit 3A feeds the flash memory module 2A with the read mode set pulse signal RDMODE at "H," so that, immediately after the busy to ready restoration, the flash memory module 2A, placed in the "status read mode," can enter the "memory read mode" where the memory contents can be read.

In the second preferred embodiment, as in the first preferred embodiment, this operation releases the address bus 4, data bus 5 and control signals, and the CPU 1 can resume its processing without running away.

Further, as described in the first preferred embodiment, when a branch instruction (JMP instruction) is placed in the user program immediately after the second command of the flash rewrite command, the user program can be resumed safely when the rewrite command processing is ended and the hold is cancelled.

The command receipt acknowledge signal IPREBUSY used in the second preferred embodiment is a signal which allows detection as to whether the first command of the automatic erase command has been accepted by the flash memory module 2A, and this signal can be used also to detect a command input error. When an instruction for checking the command receipt acknowledge signal IPREBUSY (i.e. an instruction for reading a bit assigned on the basis of the command receipt acknowledge signal IPREBUSY stored in, e.g. the control register in the flash memory control circuit 3A) is placed immediately after the first command of the flash rewrite command in the user program, then the CPU 1 can check it to know whether the first command has been accepted by the flash memory module 2A. This enhances the accuracy of command input to the flash memory module 2A.

Furthermore, the flash memory control circuit 3A has an ERRCMD signal generating circuit and a control register having a bit corresponding to the ERRCMD signal; the ERRCMD signal is a signal which is generated by latching the ready status signal RYIBY immediately after the rise of the command write signal IWE.

This control register can be read from the CPU 1; the CPU 1 reads the ERRCMD bit after issuing the second command of the flash rewrite command. When the ERRCMD bit is at "H," it indicates an error of the command, or a failure to accept the command.

The ready status signal RYIBY is latched in the same bus cycle where the second command of the automatic erase command is inputted, and the error command signal ERRCMD is generated so that it is at "H" when the second command is not normally accepted. The CPU 1 reads the error command signal ERRCMD after issuing the second command, thereby easily detecting whether an error has occurred during the issue of the second command.

This function is advantageous in that the error of the second command can be detected also when both the first and second commands of the flash rewrite command have not been accepted by the flash memory module 2 due to noise etc.

As shown above, like the first preferred embodiment, the second preferred embodiment is advantageous in that, at the time when the CPU 1 issues a rewrite command to the flush memory module, it can avoid running away which would occur when the CPU 1 cannot read instruction codes on the flush memory during the command processing, and also in that, even with the rewrite program kept placed on the flash ROM, the contents of the flash ROM in other blocks can be rewritten while that program is being executed, without requiring the transfer of the program from the flash ROM to a RAM, as was required in conventional ones.

<Third Preferred Embodiment>

FIG. 11 is a block diagram showing the basic structure of a microcontroller with a built-in flashed memory according to a third preferred embodiment of the invention.

As shown in this diagram, it additionally contains a RAM 26. The RAM 26 can be read/written from the CPU 1 with the address signal AD (20:0) on the address bus 4, the data signal DB (15:0) on the data bus 5, the read/write control signal RWB, and the instruction execution signal EB.

As stated in the first and second preferred embodiments, the CPU 1 has an instruction queue for a plurality of instructions and can perform pipeline processing. In other respects the structure is the same as that of the second preferred embodiment shown in FIG. 8.

Figure 12:
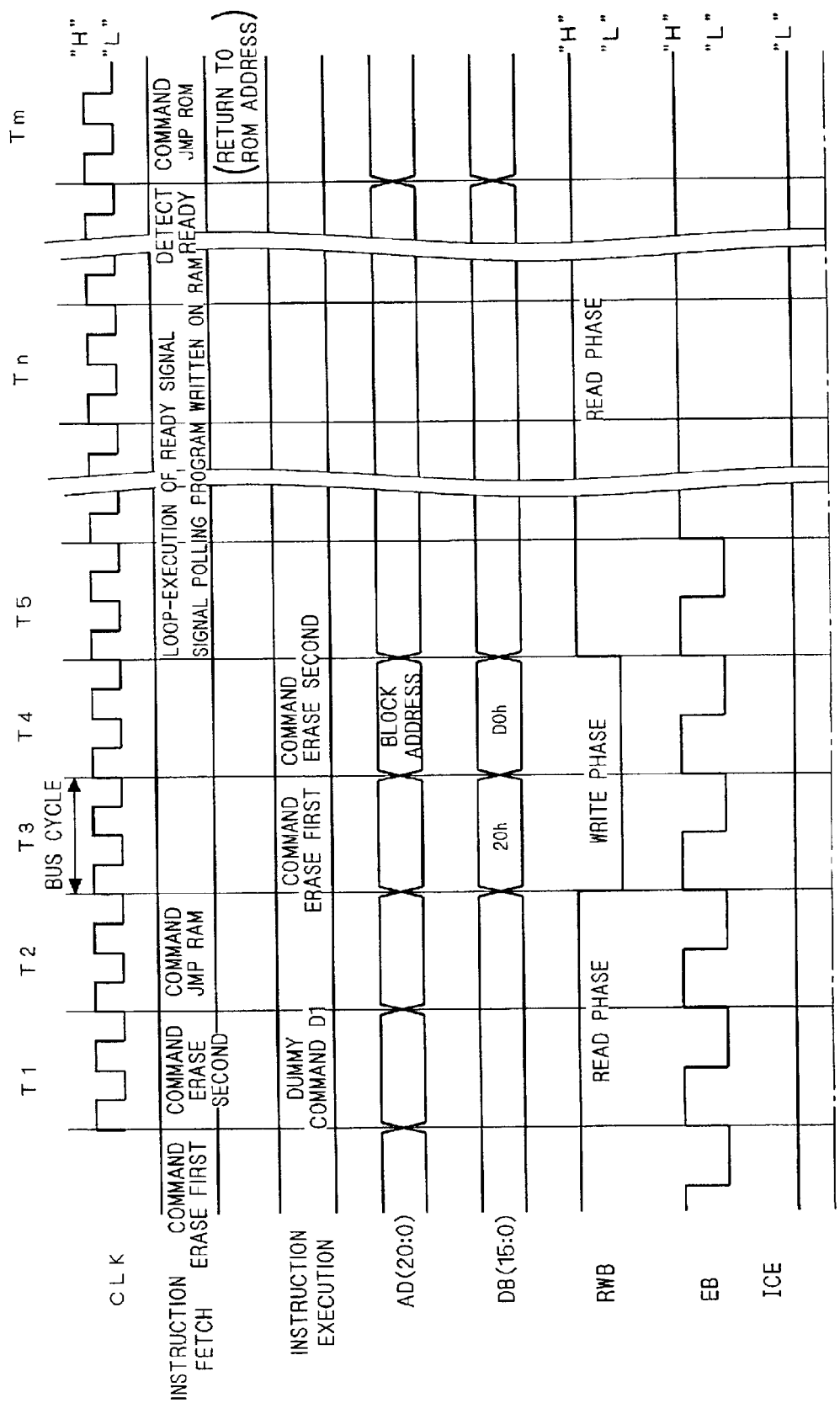
FIGS. 12 and 13 illustrate a timing chart showing the variations of signals during the execution of the block erase command in the microcontroller containing the flash memory of the third preferred embodiment.
Figure 13:
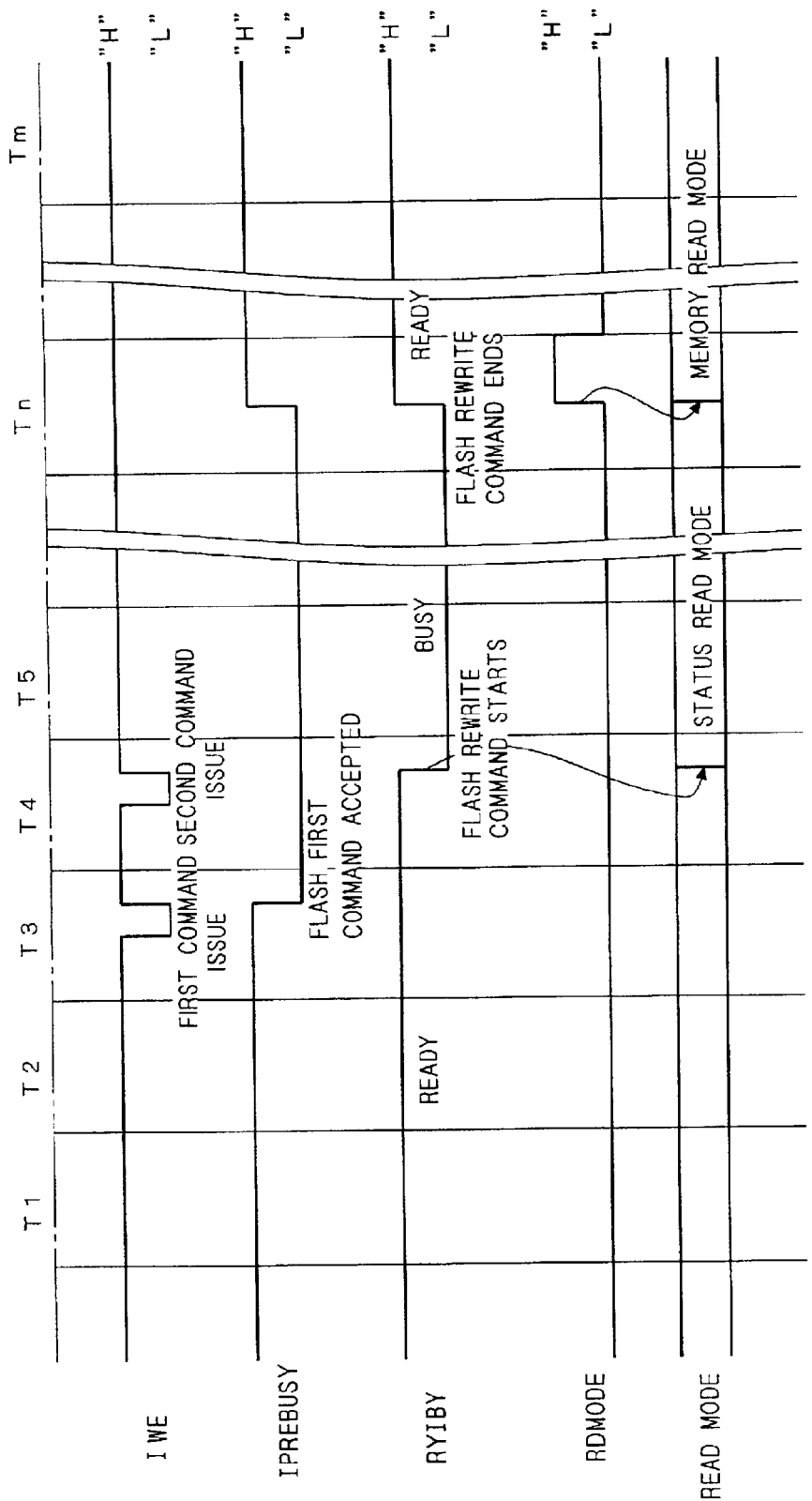

FIGS. 12 and 13 illustrate a timing chart showing the variations of signals which take place during execution of the block erase command in the microcontroller with a built-in flash memory of the third preferred embodiment. As in the first and second preferred embodiments, each of the bus cycles T1 to T5, TN, Tm, and so on, corresponds to two clock cycles of the operation clock CLK.

The operation performed when the CPU 1 issues the automatic block erase command is now described as an example in which, according to the user program, the CPU 1 issues a rewrite command to the flash memory in a block other than the block(s) where the program is placed.

When the user program requires rewriting the contents of the flash memory, it is accomplished by the procedure as shown below.

First, a program for polling for the ready bit (busy status signal), which is read from the status register 20 in the flash memory module 2A through the data bus 5, is previously transferred from the flash ROM 2A to the RAM 26. The ready bit is information which indicates the status of the flash memory module 2A; it indicates, at "H" and "L," whether the flash memory module 2A is in the ready state.

As shown in FIGS. 12 and 13, the CPU 1 runs the user program and sequentially provides the first command and the second command of the block erase command to start an automatic execution of block erasure.

A JMP instruction to a start address in the RAM 26, in which the polling program is written, is placed immediately after the flash rewrite command. Then, after the execution of the second command of the flash rewrite command, the JMP instruction fetched in the instruction queue in the CPU 1 is executed to jump to the given start address in the RAM 26.

While the rewrite command is being executed in the flash memory module 2A, the flash memory module 2A is in the "status read mode." According to the polling program written on the RAM 26, the CPU 1 issues a read instruction to the flash memory module 2A through the flash control circuit 3, and the CPU 1 can detect the status (ready/busy) of the flash memory module 2A on the basis of the ready bit in the status register 20. The CPU 1 can thus judge whether the rewrite command is being executed or has been ended.

According to the polling program in the RAM 26, the CPU 1 stands by for the completion of the processing of the flash rewrite command and detects the change from "L" (busy) to "H" (ready) of the ready bit read through the data bus 5, thereby detecting the completion of the command processing.

Immediately after the completion of the command processing, that is, in synchronization with the "L" to "H" transition of the ready status signal RYIBY, the flash memory control circuit 3A outputs the read mode signal RDMODE at active "H," so as to change the flash memory module 2A from the "status read mode" to the "memory read mode." The flash ROM data 19 can thus be read after the completion of processing of the rewrite command.

The CPU 1 can jump again to the program address on the flash memory module 2A after the completion of processing of the flash rewrite command (for example, this can be accomplished by describing an instruction for the jump immediately after the polling program subroutine on the RAM 26), so as to resume the execution of the program on the flash memory module 2A.

As shown above, according to the third preferred embodiment, the flash memory module 2A can be rewritten while using only a small capacity region on the RAM 26 mainly for the flash module busy status polling program.

It is thus possible to reduce the RAM capacity required for the rewrite program or the register save stack during the flash memory rewriting processing and the capacity of the RAM 26 can be optimized to a necessary minimum.

<Fourth Preferred Embodiment>

Figure 14:
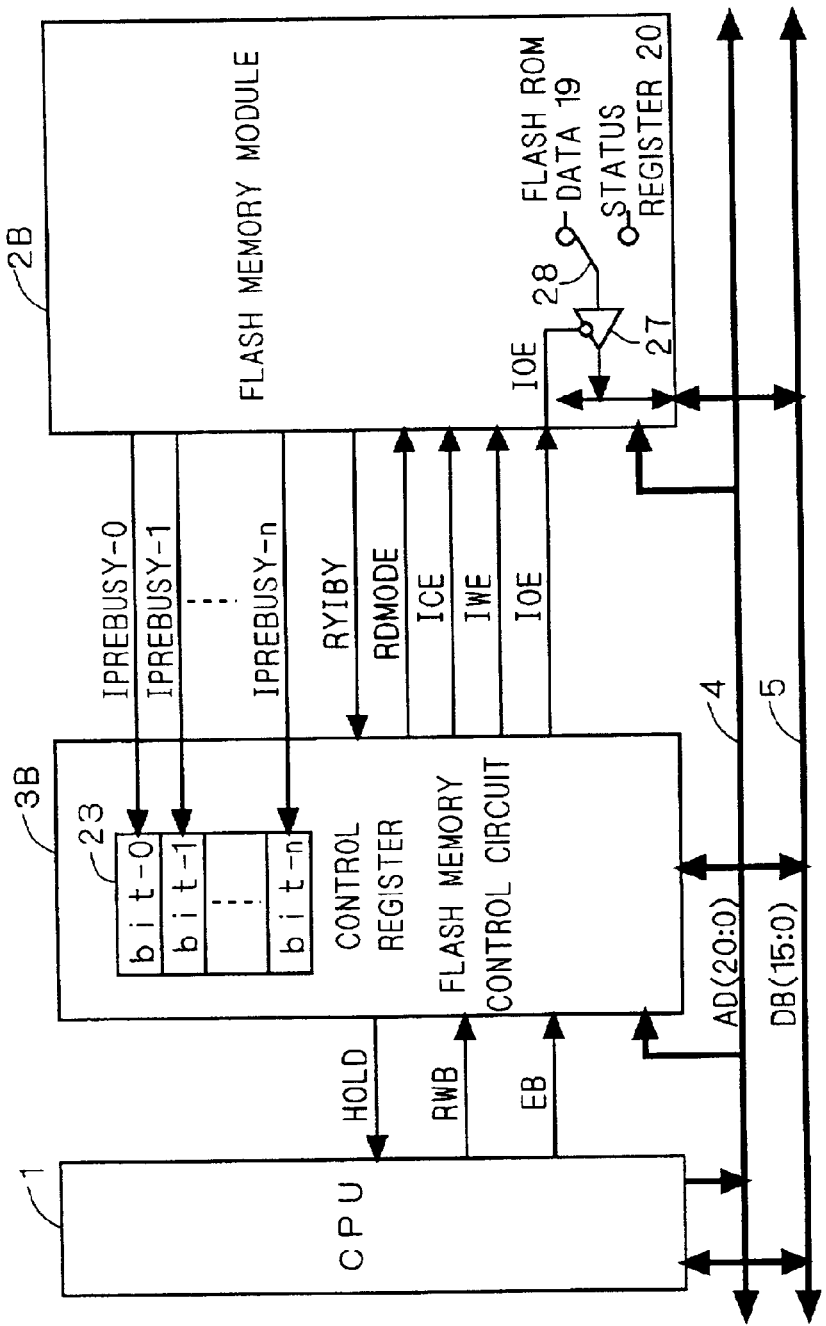
FIG. 14 is a block diagram showing the basic structure of a microcontroller with a built-in flash memory according to a fourth preferred embodiment of the invention.

FIG. 14 is a block diagram showing the basic structure of a microcontroller with a built-in flash memory according to a fourth preferred embodiment of the present invention.

As shown in this diagram, the flash memory module 2B outputs command receipt acknowledge signals IPREBUSY-0 to IPREBUSY-n. These command receipt acknowledge signals IPREBUSY-0 to IPREBUSY-n are signals which are respectively assigned to different kinds of rewrite commands to the flash memory module 2B (commands such as the automatic block erasure, automatic write, etc.)

The flash memory control circuit 3B contains a control register 23; the control register 23 can store the values of the command receipt acknowledge signals IPREBUSY-0 to IPREBUSY-n as its internal bit-0 to bit-n. The control register 23 can be read-accessed from the CPU 1. In other respects, the structure is the same as that shown in FIG. 8 in the second preferred embodiment.

For example, when the CPU 1 executes a predetermined program and issues a command to the flash memory module 2B, the data may change in the microcomputer due to electrical noise etc., and then it may be accepted as a different command in the flash memory module 2B. However, in the fourth preferred embodiment having the structure shown above, after issuing the first command of the rewrite command to the flash memory module 2B and before issuing the second command, the CPU 1 can check whether the command receipt acknowledge signal IPREBUSY-i (i is any of 1 to n) which corresponds to that rewrite command is effective or not, by reading the value of the bit-i in the control register 23. The CPU 1 can thus know whether the rewrite command has been correctly accepted by the flash memory module 2B in a manner where the kinds of the rewrite commands can be distinguished.

At this time, generation of the hold signal HOLD is controlled with a logical OR signal of the bits-0 to bit-n in the control register 23.

As shown above, according to the fourth preferred embodiment, it is possible to confirm whether the kind of the command issued from the CPU 1 to the flash memory agrees with the kind of the command actually accepted in the flash memory module 2B, so as to enhance the accuracy of the command issue.

<Fifth Preferred Embodiment>

Figure 15:
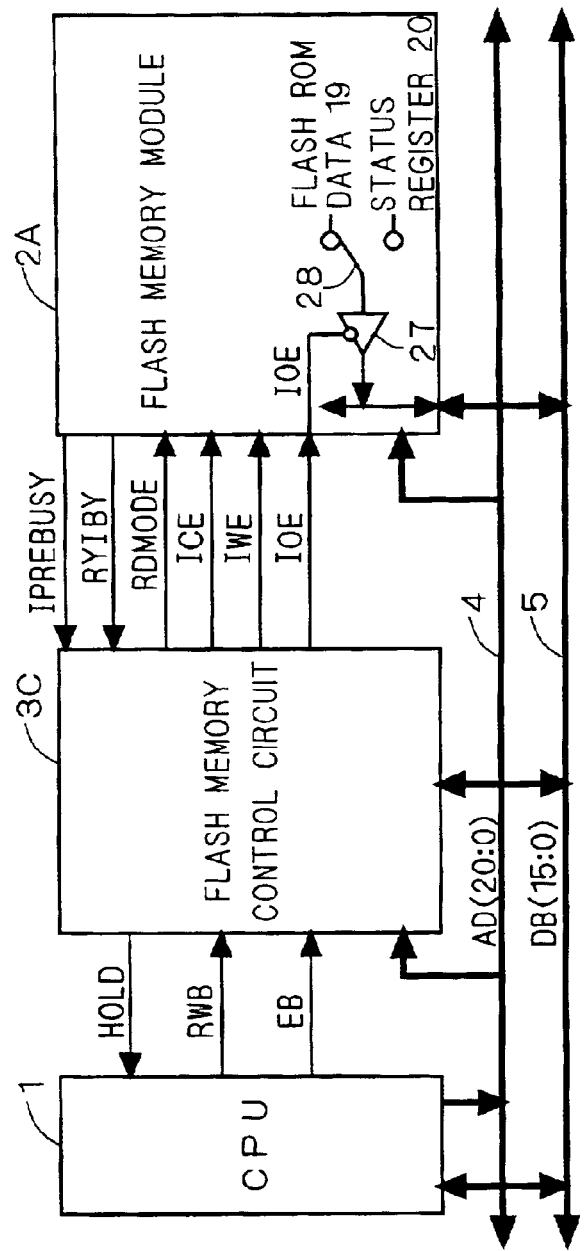
FIG. 15 is a block diagram showing the basic structure of a microcontroller with a built-in flash memory according to a fifth preferred embodiment of the invention.

FIG. 15 is a block diagram showing the basic structure of a microcontroller with a built-in flash memory according to a fifth preferred embodiment of the invention.

The fifth preferred embodiment is characterized by operation performed according to bus timing in which the bus cycles in which the flash memory rewrite commands are issued, particularly the bus cycle for the second command, are enlarged, where after the rise of the command write signal IWE, a wait cycle is placed within that bus cycle.

Figure 16:
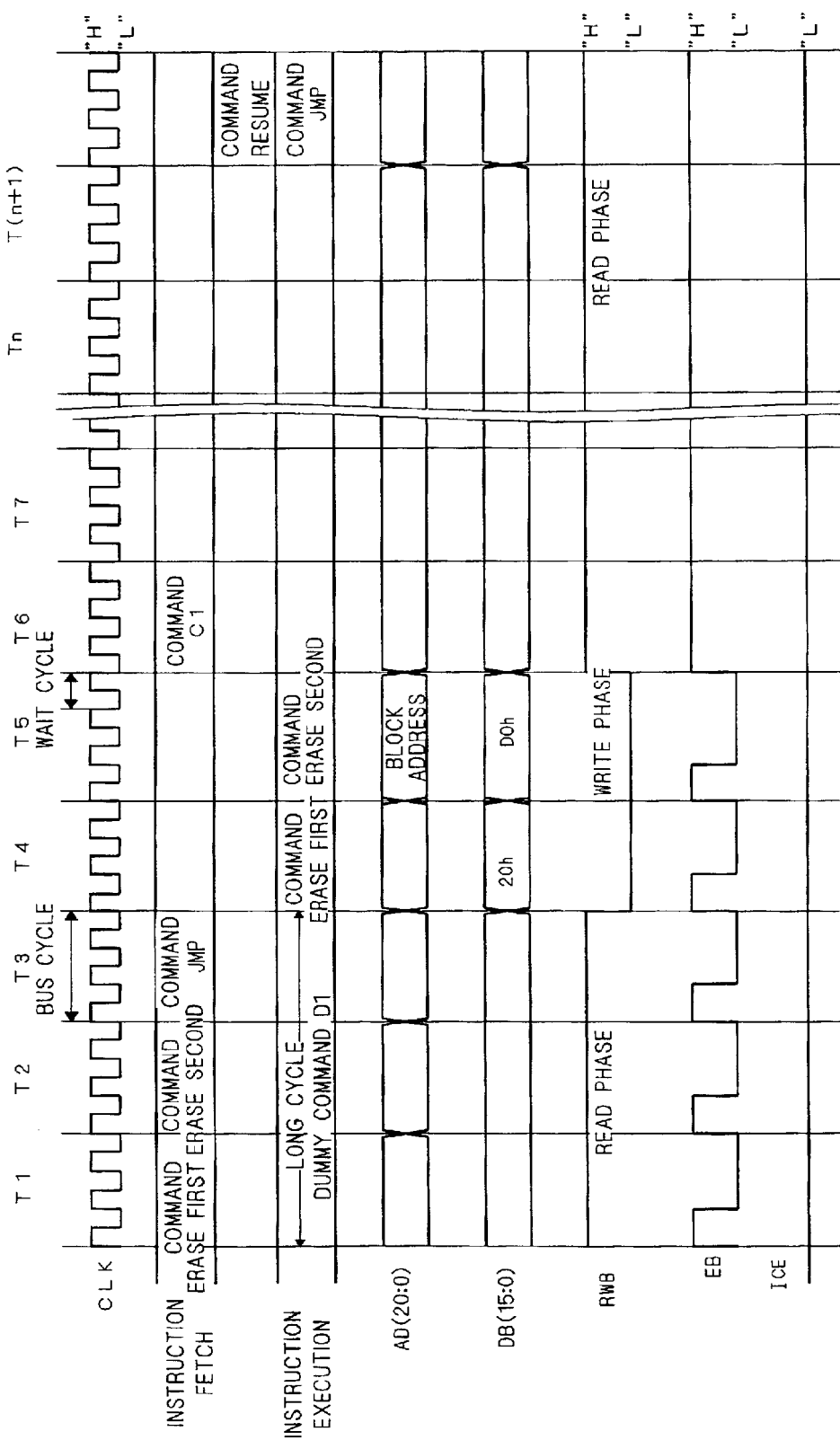
FIGS. 16 and 17 illustrate a timing chart showing the variations of signals during the execution of the block erase command in the microcontroller containing the flash memory of the fifth preferred embodiment.
Figure 17:
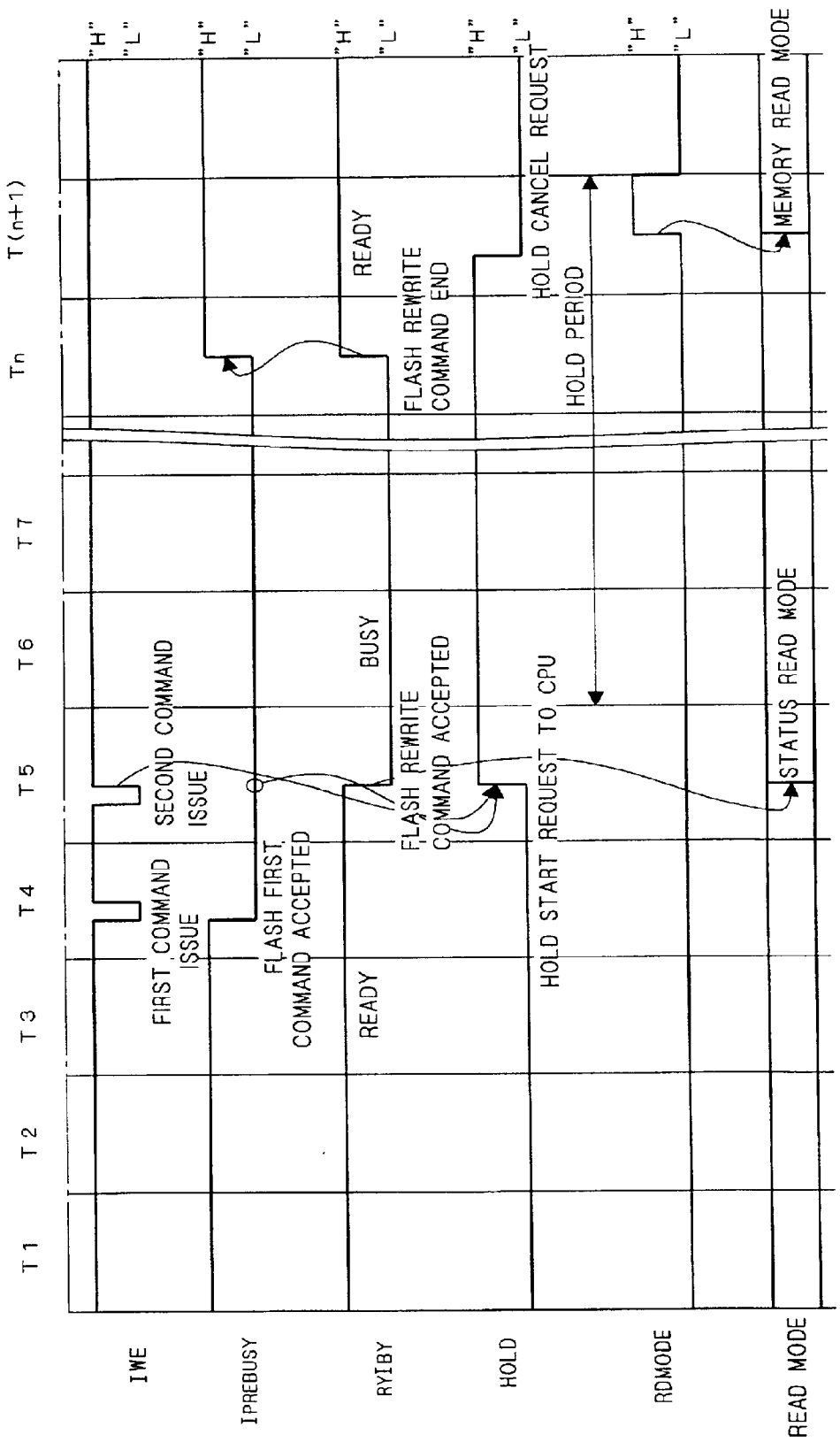

FIGS. 16 and 17 illustrate a timing chart showing the variations of signals which take place during execution of the block erase command in the microcontroller with a built-in flash memory of the fifth preferred embodiment. In this chart, all bus cycles are set to operate with three clock cycles of the operation clock CLK.

In the fifth preferred embodiment, after the issue of the second command of the flash rewrite command, a wait cycle WT is provided within that same bus cycle. The circuit for generating the hold signal HOLD in the flash memory control circuit 3C is designed so that the hold signal HOLD becomes active when the command receipt acknowledge signal IPREBUSY is active and the ready status signal RYIBY indicates busy. This hold signal HOLD can start the halt from the next bus cycle T6.

After the rewrite command has been processed, the flash memory control circuit 3C causes the hold signal HOLD to change from "H" to "L," or to become ineffective, one bus cycle after the "L" to "H" transition of the ready status signal RYIBY. When the hold signal HOLD is canceled, the program execution, being interrupted, can be resumed. In other respects the structure and operation are the same as those in the second preferred embodiment.

As shown above, according to the fifth preferred embodiment, the hold signal HOLD can be generated on the basis of only the command receipt acknowledge signal IPREBUSY and the ready status signal RYIBY. In addition, the bus cycle is set to three cycles of the operation clock CLK, which is longer by one cycle than those in other preferred embodiments, so that a wait cycle WT can be provided in the same bus cycle after the issue of the second command of the flash rewrite command. The bus cycle T6 and the following cycles can thus be surely set as a hold period.

While the invention has been described in detail, the foregoing description is in all aspects illustrative and not restrictive. It is understood that numerous other modifications and variations can be devised without departing from the scope of the invention.

What is claimed is:

1. A microcomputer, comprising:

a CPU configured to execute instructions;

a flash memory portion divided into a plurality of blocks; and a flash memory control circuit for controlling a rewrite operation to said flash memory portion, wherein said CPU is configured to execute a predetermined program stored in at least one of said plurality of blocks, said predetermined program including instructions for rewriting a block other than said at least one of said plurality of blocks in said flash memory portion;

said flash memory portion is configured to execute the rewrite operation in said block other than said at least one of said plurality of blocks based on a rewrite command, and to output a ready status signal indicating whether said rewrite operation is being executed;

said flash memory control circuit is configured to receive said ready status signal, whereby when said ready status signal indicates that said rewrite operation is to be executed, said flash memory control circuit provides a hold signal to said CPU, wherein said hold signal indicates that predetermined signals required for said CPU to access said flash memory portion should be fixed to constant values;

said predetermined signals include an address signal, a data signal, and a control signal of said flash memory control circuit;

said flash memory control circuit is configured to set a pre-hold signal active after a beginning of receipt of said rewrite command and before an end of the receipt of said rewrite command; and said flash memory control circuit is configured to output said hold signal indicating said predetermined signals should be fixed to the constant values when said pre-hold signal is active at the end of the receipt of said rewrite command.

2. The microcomputer according to claim 1, wherein said flash memory control circuit includes a control register configured to be set/reset to define whether said pre-hold signal is active or inactive; and said flash memory control circuit is configured to set said control register after the beginning of the receipt of said rewrite command.

3. The microcomputer according to claim 2, wherein said rewrite command includes first and second partial commands that are issued in a first-to-second order, and the rewrite operation is started at completion of the issue of said first and second partial commands, said predetermined program includes a program in which a register write instruction for setting said control register is described between said first partial command and said second partial command; and said flash memory control circuit starts to output said hold signal to said CPU according to whether said control register is set or reset at the beginning of the issue of said second partial command.

4. A microcomputer, comprising:

a CPU configured to execute instructions;

a flash memory portion divided into a plurality of blocks; and a flash memory control circuit for controlling a rewrite operation to said flash memory portion, wherein said CPU is configured to execute a predetermined program stored in at least one of said plurality of blocks, said predetermined program including instructions for rewriting a block other than said at least one of said plurality of blocks in said flash memory portion;

said flash memory portion is configured to execute the rewrite operation in said block other than said at least one of said plurality of blocks based on a rewrite command, and to output a ready status signal indicating whether said rewrite operation is being executed;

said flash memory control circuit is configured to receive said ready status signal, whereby when said ready status signal indicates that said rewrite operation is to be executed, said flash memory control circuit provides a hold signal to said CPU, wherein said hold signal indicates that predetermined signals required for said CPU to access said flash memory portion should be fixed to constant values;

said predetermined signals include an address signal, a data signal, and a control signal of said flash memory control circuit;

said flash memory portion is configured to set a rewrite command receipt acknowledge signal active at a beginning of receipt of said rewrite command; and said flash memory control circuit is configured to output said hold signal indicating said predetermined signals should be fixed to the constant values when said rewrite command receipt acknowledge signal is active at an end of the receipt of said rewrite command by said flash memory portion.

5. The microcomputer according to claim 4, wherein said rewrite command includes first and second partial commands that are issued in a first-to-second order; and said flash memory control circuit starts to output said hold signal to said CPU in accordance with a value of said rewrite command receipt acknowledge signal at the beginning of the issue of said second partial command.

6. The microcomputer according to claim 4, wherein said rewrite command receipt acknowledge signal includes a signal that can be referred to from said CPU.

7. The microcomputer according to claim 6, wherein said rewrite command includes first and second partial commands that are issued in a first-to-second order; and said flash memory control circuit is configured to generate a latched signal by latching said ready status signal immediately after the issuance of said second partial command, and to store said latched signal so that said CPU can refer to said latched signal.

8. The microcomputer according to claim 7, wherein said flash memory control circuit is configured so that said CPU can refer to said rewrite command receipt acknowledge signal after the issuance of said first partial command to check whether the command has been accepted, and so that said CPU can refer to said latched signal immediately after the issue of said second partial command to check whether the command has been accepted.

9. The microcomputer according to claim 4, wherein said flash memory portion is configured to output said rewrite command receipt acknowledge signal to said flash memory control circuit as a plurality of rewrite command receipt acknowledge signals corresponding to different kinds of said rewrite command; and said flash memory control circuit stores values of said plurality of rewrite command receipt acknowledge signals so that said CPU can refer to values of said plurality of rewrite command receipt acknowledge signals.

10. The microcomputer according to claim 4, wherein the microcomputer is configured to have an operation timing mode in which, when said rewrite command to said flash memory portion is issued in one bus cycle period for issue of an instruction to a peripheral functional block, a wait cycle is placed within the one bus cycle period after completion of the issue of said rewrite command to said flash memory portion.

11. The microcomputer according to claim 4, wherein said rewrite command includes a plurality of rewrite commands; and said rewrite command receipt acknowledge signal includes a signal generated based on a logical OR of receipt acknowledge signals respectively corresponding to said plurality of rewrite commands.

12. A microcomputer, comprising:

a CPU configured to execute instructions;

a flash memory portion divided into a plurality of blocks; and a flash memory control circuit for controlling a rewrite operation to said flash memory portion, wherein said CPU is configured to execute a predetermined program stored in at least one of said plurality of blocks, said predetermined program including instructions for rewriting a block other than said at least one of said plurality of blocks in said flash memory portion;

said flash memory portion is configured to execute the rewrite operation in said block other than said at least one of said plurality of blocks based on a rewrite command, and to output a ready status signal indicating whether said rewrite operation is being executed;

said flash memory control circuit is configured to receive said ready status signal, whereby when said ready status signal indicates that said rewrite operation is to be executed, said flash memory control circuit provides a hold signal to said CPU wherein said hold signal indicates that a signal required for said CPU to access said flash memory portion should be fixed to a constant value;

said flash memory control circuit is configured to set a pre-hold signal active after a beginning of receipt of said rewrite command and before an end of the receipt of said rewrite command; and said flash memory control circuit is configured to output said hold signal when said pre-hold signal is active at the end of the receipt of said rewritten command.

13. A microcomputer, comprising:

a CPU configured to execute instructions;

a flash memory portion divided into a plurality of blocks; and a flash memory control circuit for controlling a rewrite operation to said flash memory portion, wherein said CPU is configured to execute a predetermined program stored in at least one of said plurality of blocks, said predetermined program including instructions for rewriting a block other than said at least one of said plurality of blocks in said flash memory portion;

said flash memory portion is configured to execute the rewrite operation in said block other than said at least one of said plurality of blocks based on a rewrite command, and to output a ready status signal indicating whether said rewrite operation is being executed;

said flash memory control circuit is configured to receive said ready status signal, whereby when said ready status signal indicates that said rewrite operation is to be executed, said flash memory control circuit provides a hold signal to said CPU, wherein said hold signal indicates that a signal required for said CPU to access said flash memory portion should be fixed to a constant value;

said flash memory portion is configured to set a rewrite command receipt acknowledge signal active at a beginning of receipt of said rewrite command; and said flash memory control circuit is configured to output said hold signal when said rewrite command receipt acknowledge signal is active at an end of the receipt of said rewrite command by said flash memory portion.

* * * * *